(12) United States Patent
Kang et al.

(10) Patent No.: US 7,336,315 B2
(45) Date of Patent: Feb. 26, 2008

(54) APPARATUS AND METHOD FOR PERFORMING INTRA-FIELD INTERPOLATION FOR DE-INTERLACER

(75) Inventors: Suk-Kyu Kang, Seoul (KR); Dong-Il Han, Seoul (KR); Chul-Ho Lim, Seoul (KR)

(73) Assignee: Ed-Tech Co., Ltd., Seoul (KR)

( * ) Notice: Subject to any disclaimer, the term of this patent is extended or adjusted under 35 U.S.C. 154(b) by 651 days.

(21) Appl. No.: 10/909,013

(22) Filed: Jul. 30, 2004

(65) Prior Publication Data

US 2005/0162548 A1 Jul. 28, 2005

(30) Foreign Application Priority Data

Jan. 6, 2004 (KR) .................... 10-2004-0000550

(51) Int. Cl.
*H04N 7/01* (2006.01)

(52) U.S. Cl. .................................... 348/448

(58) Field of Classification Search ................ 348/448, 348/441, 458, 459; *H04N 7/01, 11/20*
See application file for complete search history.

(56) References Cited

U.S. PATENT DOCUMENTS 7,190,406 B2 * 3/2007 Ji et al. ...................... 348/448

* cited by examiner

*Primary Examiner*—Sherrie Hsia
(74) *Attorney, Agent, or Firm*—Cooper & Dunham LLP

(57) ABSTRACT

The present invention relates, in general, to an apparatus and method for converting interlaced field image data into progressive image data in image processing techniques and, more particularly, to an apparatus and method for performing intra-field interpolation for a de-interlacer, which calculates a direction in which pixel values are changed using the variations and correlations between the pixel values of the regions on two lines in one field, and outputs an interpolated value depending on the direction, thus enabling a field to be interpolated in the change direction.

11 Claims, 7 Drawing Sheets

FIG.2
Prior Art
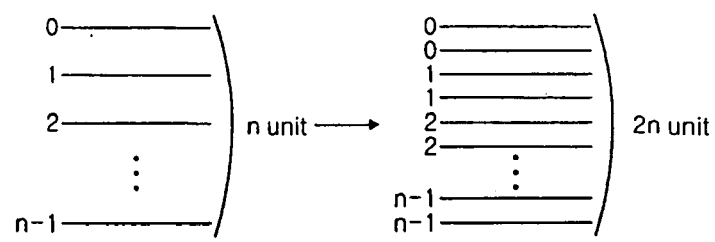
(a)
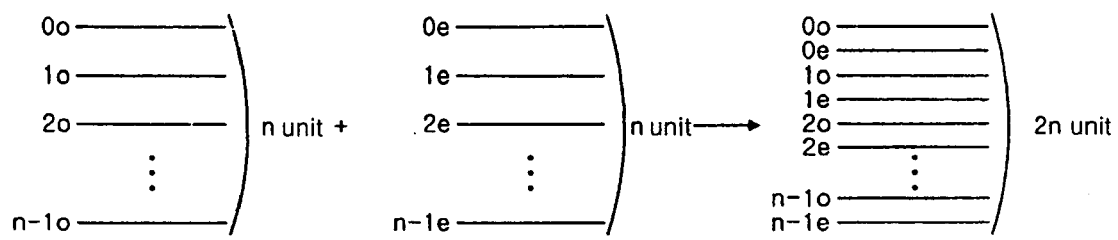
(b)
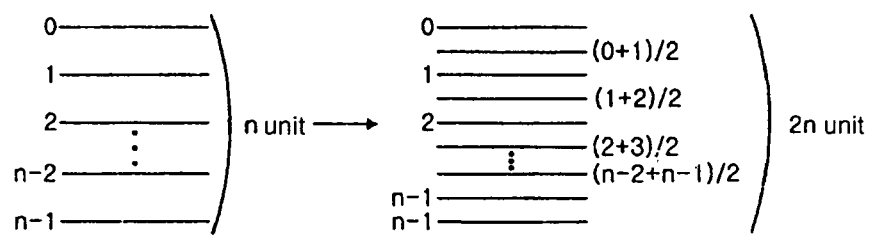
(c)

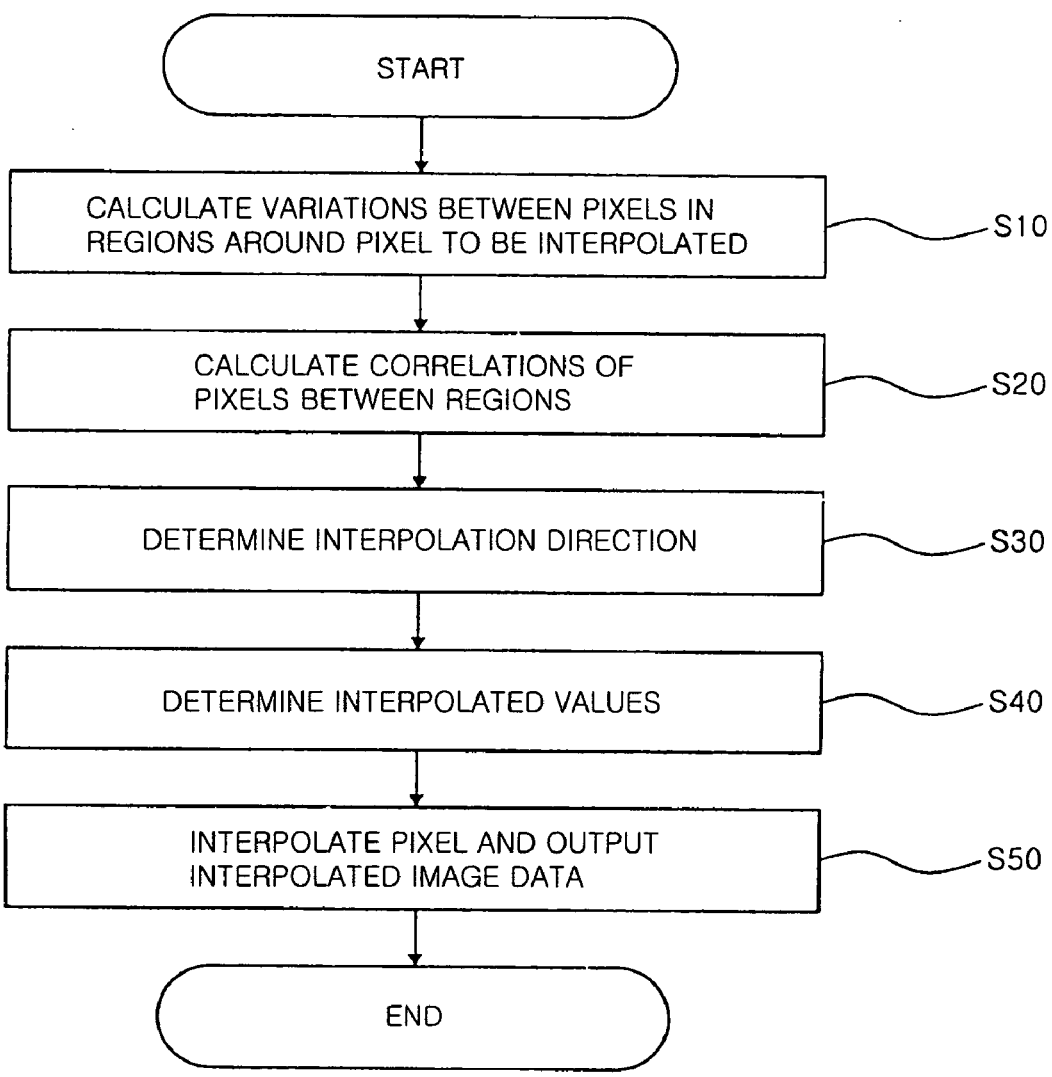

APPARATUS AND METHOD FOR PERFORMING INTRA-FIELD INTERPOLATION FOR DE-INTERLACER

BACKGROUND OF THE INVENTION

1. Field of the Invention

The present invention relates, in general, to an apparatus and method for converting interlaced field image data into progressive image data in image processing techniques and, more particularly, to an apparatus and method for performing intra-field interpolation for a de-interlacer, which calculates a direction in which pixel values are changed using the variations and correlations between the pixel values of the regions on two lines in one field, and outputs an interpolated value depending on the direction, thus enabling a field to be interpolated in the change direction.

2. Description of the Related Art

An interlace mode denotes a mode of displaying only a half of horizontal lines in a single image frame when a single image is displayed in a cathode ray tube television used in normal homes (regardless of National Television System Committee (NTSC) mode (US and Korea) or Phase Alternation by Line system (PAL) mode (Europe)). That is, interlaced image data are implemented with two fields by dividing one frame into an odd field and an even field, as shown in FIG. 1.

For example, in case of a 480 line NTSC mode (exactly, 487 active lines of 525 lines), one frame is divided into two fields each consisting of 240 lines and displayed thereby. The fields each having 240 lines, divided in this way, are alternately displayed on a screen every 1/60 second (480/60i). In this mode, there is a problem in that horizontal lines can be easily, visually discerned when the size of a display screen exceeds about 30 inches. Therefore, in the interlace mode, it can be considered that about 30 frames for one second are displayed.

In the meantime, a progressive (scan) mode is the term first defined to describe various aspects of a Digital Versatile Disc (DVD) player, and an image reproduction scheme, such as the progressive scan, can be easily understood by referring to the monitor of a computer. Currently, the progressive scan mode denotes a mode in which a computer monitor, a digital TV, such as a Plasma Display Panel (PDP) or Liquid Crystal Display (LCD) TV, or a Digital Satellite System (DSS) displays video in frames, that is, the entire image of each frame at one time, like the case where a film is projected onto a screen.

For example, the progressive scan mode allows a 480 line image to be displayed at one time every 1/60 second in the form of a full frame image (480/60p). Consequently, in the progressive scan mode, 60 frames per second are fully implemented. Therefore, the progressive scan mode enables an image quality far higher than that of the interlace mode to be realized, and does not cause a screen blur, such as aliasing at the edge of a moving object (motion artifact).

As described above, image data are processed and displayed on a screen in the progressive scan mode used in a computer monitor or etc., without being processed in the interlace mode, depending on display devices. At this time, in order to normally process interlaced image signals in a display device that processes progressive image data, a separate system for converting the interlaced image signals into progressive image signals should be provided in the display device.

In the prior art, several methods are used to convert the interlaced image signals into progressive signals (de-interlace), as described below. Conventional technologies are described in detail with reference to FIGS. 2a to 2c showing conventional methods of generating fields using line interpolation.

FIG. 2a illustrates a line repetition method, which performs de-interlacing through a scheme of simply repeating the line information of a current field to implement one frame. Such a line repetition method can be implemented using simple hardware.

FIG. 2b illustrates an inter-field interpolation method without motion compensation, which implements a single frame by simply inserting the line of a previous field between the lines of a current field. Even an inter-field interpolation without motion compensation can be implemented using simple hardware.

FIG. 2c illustrates an intra-field interpolation method, which implements a new field by inserting data, obtained by dividing two line data by 2, between two lines so as to interpolate a region between two lines in one field. Such an intra-field interpolation method is advantageous in that it improves an image quality compared to the line repetition method, and decreases an error occurrence probability compared to the inter-field interpolation without motion compensation.

According to the conventional interpolation methods, the line repetition method is disadvantageous in that an image quality is deteriorated after interpolation. Further, the inter-field interpolation method without motion compensation is advantageous in that it can be implemented using simple hardware, but it is disadvantageous in that an error occurs or an image is degraded and then an image quality is deteriorated even though interpolation is performed with respect to moving images. Further, the intra-field interpolation method is advantageous in that it improves an image quality compared to the line repetition method and has an error occurrence probability lower than that of the inter-field interpolation method without motion compensation, but it is disadvantageous in that a still image is degraded after interpolation, thus deteriorating an image quality.

SUMMARY OF THE INVENTION

Accordingly, the present invention has been made keeping in mind the above problems occurring in the prior art, and an object of the present invention is to provide an apparatus and method for performing intra-field interpolation for a de-interlacer, which calculates a direction in which pixel values are changed using the variations and correlations between the pixel values of certain regions on previous and next lines of a pixel to be interpolated, and outputs an interpolated value depending on the corresponding direction, so that the pixel value can be interpolated in a direction of motion, thus improving an image quality.

In order to accomplish the above object, the present invention provides an apparatus for performing intra-field interpolation for a de-interlacer, comprising an intra-region inter-pixel variation calculation unit receiving image data and calculating variations between pixels included in upper, lower, left and right regions on previous and next lines of a pixel to be interpolated; an inter-region pixel correlation calculation unit receiving the image data and calculating correlations between certain regions around the pixel to be interpolated; a direction determination unit determining a direction in which interpolation is to be performed using the variations between pixels and the correlations calculated by the intra-region inter-pixel variation calculation unit and inter-region pixel correlation calculation unit, respectively;

an interpolation unit determining a value of the pixel to be interpolated using pixel values in regions having a maximum correlation calculated by the inter-region pixel correlation calculation unit; and an output unit receiving interpolated values that are output from the interpolation unit in the direction determined by the direction determination unit, and outputting interpolated image data.

Preferably, the inter-region pixel correlation calculation unit may calculate a correlation between a left region on the previous line of the pixel to be interpolated and a right region of the next line of the pixel, and a correlation between a right region of the previous line of the pixel and a left region of the next line of the pixel. Further, the interpolation unit may determine the value of the pixel to be interpolated to be a mean value of middle pixels included in regions having a maximum correlation.

Further, the present invention provides a method of performing intra-field interpolation for a de-interlacer, comprising calculating variations between pixels included in regions around a pixel to be interpolated and calculating correlations of pixels between the regions using input image data; determining a direction in which interpolation is to be performed using the variations between pixels and the correlations of pixels between the regions, and determining interpolated values using the correlations; and interpolating the pixel to be interpolated depending on the determined interpolation direction and interpolated values, and then outputting interpolated image data.

Preferably, the calculating of the variations between pixels may comprise setting regions in which the variations are to be calculated, and calculating the variations for each of the regions. Preferably, the regions in which the variations are to be calculated may include left, right and middle regions of a previous line of the pixel to be interpolated, and left, right and middle regions of a next line of the pixel.

Preferably, the calculating of the variations for each of the regions may comprise determining a mean value of pixels included in each of the regions, and obtaining absolute differences between respective pixel values and the mean value.

Preferably, the calculating of the correlations of pixels between regions may comprise calculating a correlation (left direction correlation) between a left shift region of the previous line of the pixel to be interpolated and a right shift region of the next line of the pixel, and calculating a correlation (right directional correlation) between a right shift region of the previous line of the pixel and a left shift region of the next line of the pixel.

Preferably, the calculating of the correlations between shift regions may be performed while shifting both the shift region on the previous line of the pixel to be interpolated and the shift region on the next line of the pixel by one frame in opposite directions. Further, the determining of the interpolation direction may be performed so that a minimum value of left direction correlation values and a minimum value of right direction correlation values are compared to each other, and the interpolation direction is determined to be a vertical direction when a difference between the minimum values is less than a predetermined threshold.

Preferably, the determining of the interpolated values may be performed so that each of the interpolated values is determined to be a mean value of middle pixels included in shift regions having a maximum correlation of left and right direction correlations.

BRIEF DESCRIPTION OF THE DRAWINGS

The above and other objects, features and other advantages of the present invention will be more clearly understood from the following detailed description taken in conjunction with the accompanying drawings, in which:

FIGS. 2a to 2c are views showing conventional methods of generating fields using line interpolation;

FIG. 7 is a flowchart of a method of performing intra-field interpolation for a de-interlacer according to the present invention.

DESCRIPTION OF THE PREFERRED EMBODIMENTS

Hereinafter, an apparatus and method for performing intra-field interpolation for a de-interlacer according to embodiments of the present invention will be described in detail with reference to the attached drawings.

Figure 1:
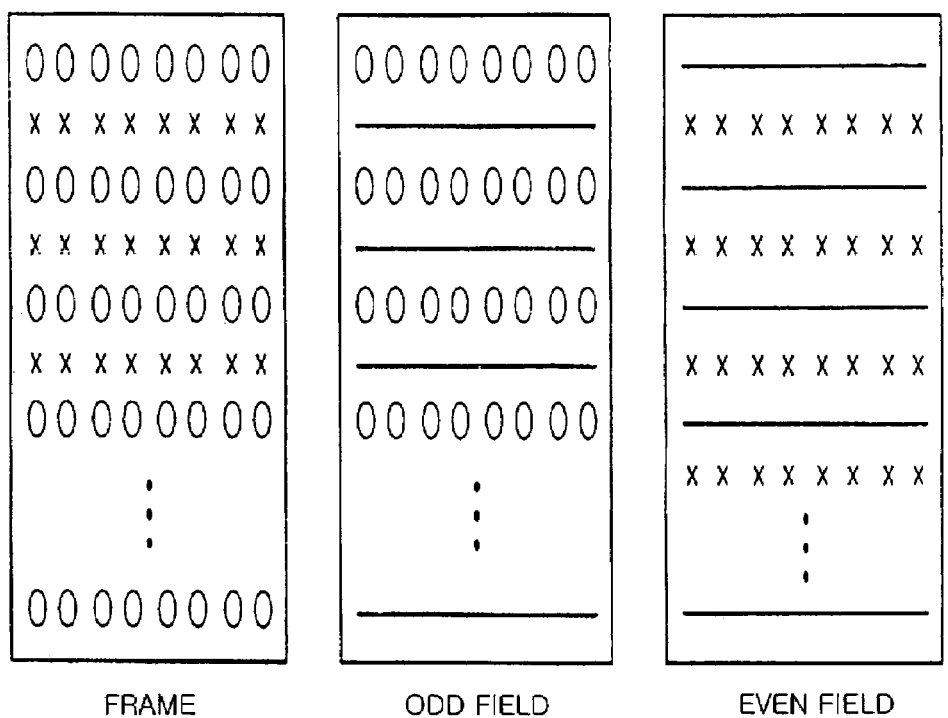
FIG. 1 is a view illustrating a conventional interlacing method.
Figure 3:
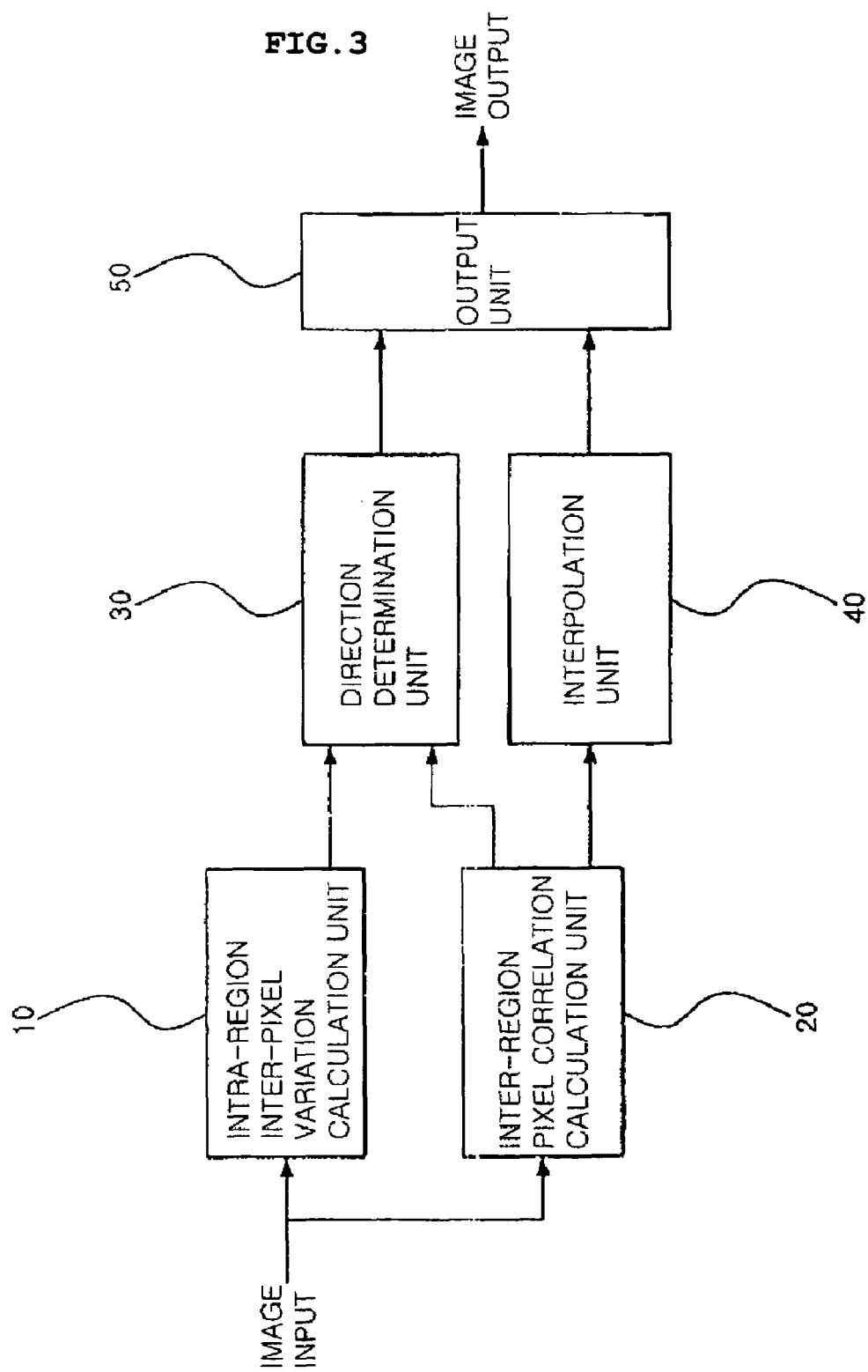
FIG. 3 is a block diagram of an apparatus for performing intra-field interpolation for a de-interlacer according to the present invention.

FIG. 3 is a block diagram of an apparatus for performing intra-field interpolation for a de-interlacer according to the present invention. The intra-field interpolation apparatus includes an intra-region inter-pixel variation calculation unit 10, an inter-region pixel correlation calculation unit 20, a direction determination unit 30, an interpolation unit 40 and an output unit 50.

The intra-region inter-pixel variation calculation unit 10 functions to receive image data and calculate variations between the right and left pixels and between the upper and lower pixels of previous and next lines belonging to a certain region including a pixel to be currently interpolated. That is, variations between pixels included in the left, right and middle (upper) regions on the previous line of the pixel to be interpolated, and the left, right and middle (lower) regions on the next line of the pixel are calculated. As will be described later, the variations between pixels are calculated by obtaining a mean value of the pixels included in each of the regions and absolute differences between respective pixel values and the mean value.

The inter-region pixel correlation calculation unit 20 functions to receive image data and calculate correlations between certain regions that are placed around the pixel to be interpolated and include a predetermined number of pixels. The number of pixels included in each of the certain regions can be changed according to situations, and the correlations between certain regions can be more precisely calculated as the number of pixels included in each region increases. The calculated correlations include a correlation between a left region on the previous line of the pixel to be interpolated and a right region on the next line of the pixel, and a correlation between a right region on the previous line of the pixel and a left region on the next line of the pixel. As will be described later, the method of calculating the correlations between the certain regions is performed by selecting shift regions (each including a part of pixels included in the certain regions) and calculating the correlations while shifting the shift regions by one pixel in opposite directions.

The direction determination unit 30 functions to determine a direction in which the pixel is to be interpolated, using the intra-region inter-pixel variations, calculated by the intra-region inter-pixel variation calculation unit 10, and the correlations between certain regions, calculated by the inter-region pixel correlation calculation unit 20. The above-described interpolation direction may be a vertical or diagonal direction. The interpolation direction will be described in detail later.

The interpolation unit 40 determines the values of the pixel to be interpolated using pixels included in shift regions having a maximum correlation when the inter-region pixel correlation calculation unit 20 sets shift regions and calculates correlations while shifting the shift regions on the previous and next lines of the pixel to be interpolated in opposite directions. That is, when a correlation between a shift region, located on the left side of the previous line of the pixel to be interpolated, and a shift region, located on the right side of the next line of the pixel to be interpolated, is calculated, a shift region having the maximum correlation can be detected if the correlations are calculated by shifting the shift region of the previous line by one pixel from right to left and shifting the shift region of the next line by one pixel from left to right. Each value of the pixel to be interpolated is determined using the middle pixel values of the pixels included in the shift regions having the maximum correlation (that is, a value obtained by dividing the sum of the middle pixel values by 2, or a mean value of the middle pixel values).

The output unit 50 functions to receive information related to the direction determined by the direction determination unit and the interpolated values that are determined and output by the interpolation unit, and to perform interpolation and output the interpolated image. The pixel is interpolated as the output unit outputs an interpolated value depending on the interpolation direction, so that the interpolation results are shown to users.

Next, the operating process related to an intra-field interpolation method for a de-interlacer, which is another aspect of the present invention, and the embodiment thereof are described in detail with reference to FIGS. 3 to 7.

Figure 4:
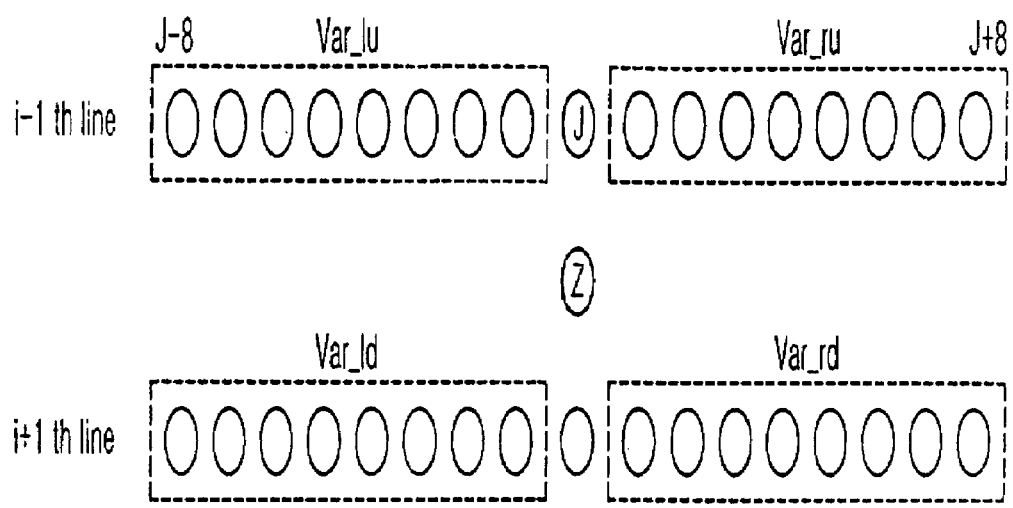
FIG. 4 is a view showing an example of the setting of regions performed by an intra-region inter-pixel variation calculation unit of FIG. 3.
Figure 5:
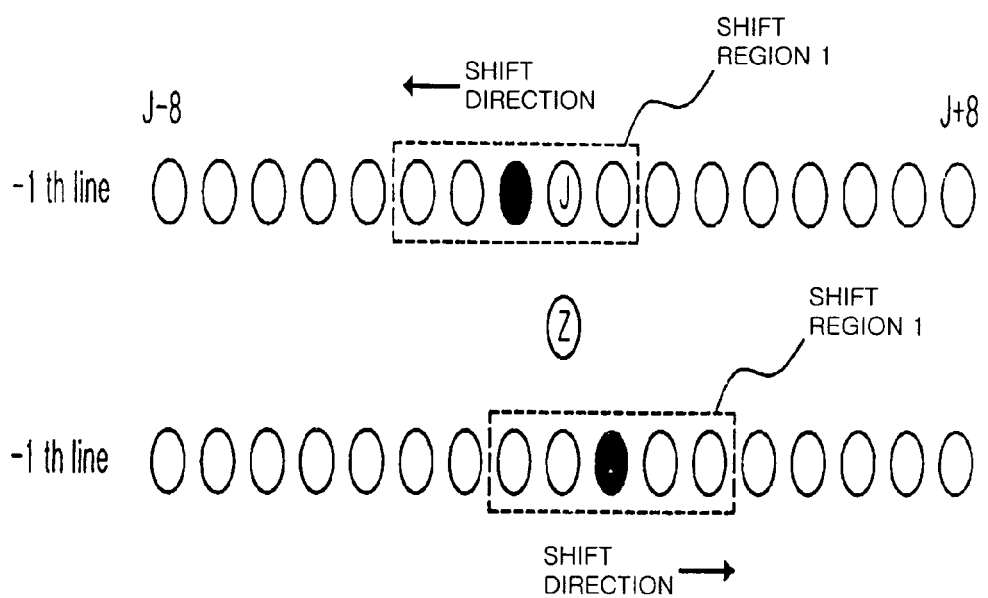
FIG. 5 is a view showing an example of shift regions and directions performed by an inter-region pixel correlation calculation unit of FIG. 3.
Figure 6:
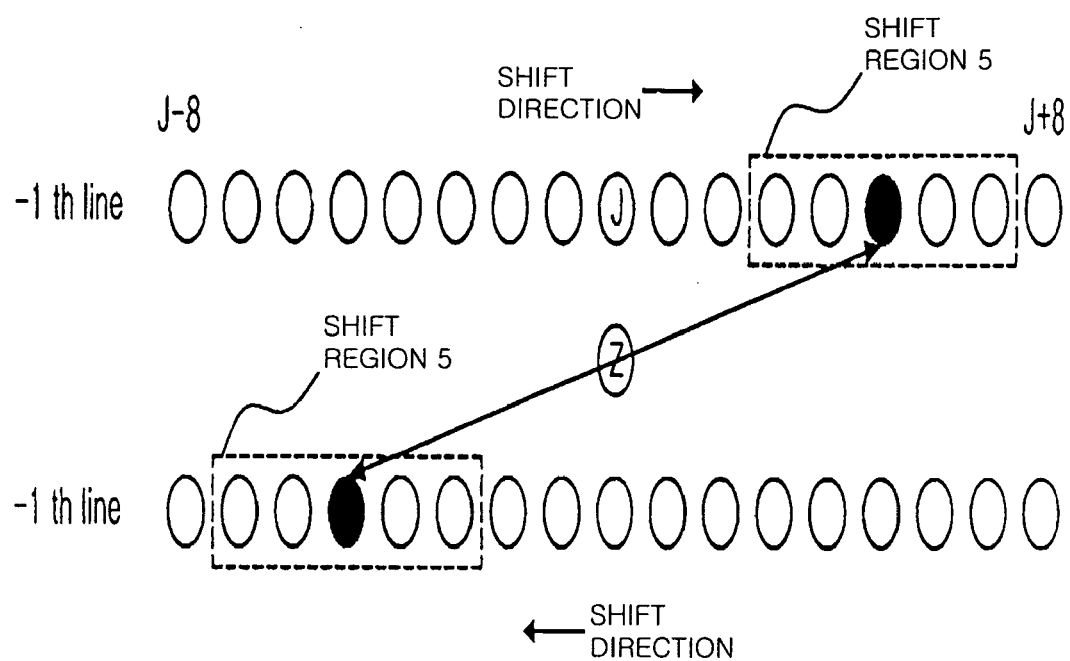
FIG. 6 is a view showing an example of the determination of interpolated values in shift regions having a maximum correlation.

FIG. 3 is a block diagram of an apparatus for performing intra-field interpolation for a de-interlacer according to the present invention, FIG. 4 is a view showing an example of the setting of regions performed by an intra-region inter-pixel variation calculation unit of FIG. 3, FIG. 5 is a view showing an example of shift regions and directions performed by an inter-region pixel correlation calculation unit of FIG. 3, FIG. 6 is a view showing an example of the determination of interpolated values in shift regions having a maximum correlation, and FIG. 7 is a flowchart of a method of performing intra-field interpolation for a de-interlacer according to the present invention.

The intra-region inter-pixel variation calculation unit calculates the variations between pixels located in regions around the pixel to be interpolated using input image data to perform intra-field interpolation in the de-interlacer (which is a device for converting interlaced image data into progressive image data) of the present invention, and the inter-region pixel correlation calculation unit calculates the correlations between certain regions at steps S10 and S20.

In order to calculate the variations between pixels located in the regions around the pixel to be interpolated, the regions, placed around the pixel to be interpolated and required to calculate the variations, must be first set and the variations must be calculated with respect to the set regions.

FIG. 4 is a view showing an example of the setting of regions performed by the intra-region inter-pixel variation calculation unit. As shown in FIG. 4, 17 pixels are set in a horizontal direction with respect to each of the previous and next lines of the pixel to be interpolated. Further, regions required to calculate the variations are set to include the left, right and middle (not shown) regions of the previous line of the pixel to be interpolated, and the left, right and middle (not shown) regions of the next line of the pixel, in which each of the regions is set to have 8 pixels.

In the meantime, the calculation of variations is performed by the intra-region inter-pixel variation calculation unit to sum all of the pixel values included in each set region and obtain a mean value of the pixel values, to obtain absolute differences between respective pixel values and the mean value and to sum the respective absolute differences. Such a calculation process is executed by the following Equation (in this case, only an equation for calculating the variations between pixels in the right region on the previous line of the pixel to be interpolated is expressed, and equations for the remaining regions are performed by the same equation).

$$M\_ru = \frac{1}{8}\sum_{k=1}^{k=8} |P(i-1, j+k)| \quad [1]$$

$$Var\_ru = \sum_{k=1}^{k=8} |M\_ru - p(i-1, j+k)|$$

In the above Equation [1], M_ru is the mean value of the pixels in the right region on the previous line of the pixel to be interpolated, Var_ru is the value obtained by calculating absolute differences between the respective pixel values and the mean value and summing the absolute differences, and P(i−1,j) is the pixel of the previous line corresponding to the position of the pixel to be currently interpolated. Therefore, the inter-pixel variation calculation unit calculates the variations between 6 pixels corresponding to the left region Var_lu, the right region Var_ru and the middle region Var_mu on the previous line, and the left region Var_ld, the right region Var_rd and the middle region Var_md of the next line, respectively.

The process of calculating the correlations of pixels between regions at step S20 is executed in two directions. First, a correlation (left direction correlation) between the left shift region on the previous line of the pixel to be interpolated is calculated and the right shift direction on the next line of the pixel is calculated, and a correlation (right direction correlation) between the right shift region on the previous line of the pixel to be interpolated and the left shift region on the next line of the pixel is calculated.

FIG. 5 illustrates a method of setting the shift regions and directions at the time of calculating correlations by the inter-region pixel correlation calculation unit. As shown in FIG. 5, all of monitored pixels are 17 pixels in a horizontal direction, and a shift region is set to include 5 pixels. Further, FIG. 5 illustrates that shift regions located on the previous and next lines shift in opposite directions. That is, the calculation of correlations between the shift regions is performed while shifting both the shift region located on the previous line of the pixel to be interpolated and the shift region located on the next line of the pixel to be interpolated by one pixel in opposite directions.

As described above, when the correlations are calculated as the shift region shifts by one pixel, the number of correlations obtained with respect to each of the left and right directions is 6. In detail, as shown in FIG. 5, shift regions required to calculate a first correlation include a shift region including 5 pixels from pixels j−3 to j+1 located on the previous line of the pixel to be interpolated and a shift region including 5 pixels from pixels j−1 to j+3 located on the next line thereof, so that correlations are calculated by shifting the shift regions in shift directions by one pixel. Therefore, a total of 6 correlations are calculated with respect to each direction.

For a method of calculating the above-described correlations, it can be generally determined that the sum of multiplication results of corresponding pixel values is obtained and a correlation between pixels becomes large as the sum of the multiplication results becomes large. However, in the present invention, the sum of difference values between corresponding pixel values is obtained in consideration of the implementation of the calculation using hardware, and it is determined that a correlation becomes large as the sum becomes smaller. The corresponding pixel values denote the pixel values having relationships, such as the relationship between the pixel j−3 of the previous line of the pixel to be interpolated and the pixel j−1 of the next line of the pixel to be interpolated, between the pixel j−2 of the previous line of the pixel to be interpolated and the pixel j of the next line of the pixel, and between the pixel j−1 of the previous line of the pixel and the pixel j+1 of the next line of the pixel.

In the above-described regions, a difference value between diagonally located pixels is detected and calculated by the following Equation [2], so that the correlation Cor_d between the pixel values is calculated, where d denotes the right r or left l direction of the previous line, or the left l or right r direction of the next line.

$$\text{Cor\_l} = \sum_{k=-1+m}^{k=3+m} |p(i-1, j-k) - p(i+1, j-k+m+2)| \quad [2]$$

Equation [2] represents an equation for obtaining a correlation corresponding to each shift region, where m of the variables indicates the variations of the shift region. The shift region of FIG. 5 represents a state of m=0, and shifts in the shift direction with the increase of m. As shown in FIG. 5, when the 17 pixels are set in the horizontal direction, 6 correlation values in each direction can be calculated, so that m has values from 0 to 5. Therefore, as the number of set horizontal pixel values (monitored regions) increases, m would increase.

If the variations between pixels in regions and correlations between certain regions are calculated through the above-described process and embodiments, a direction, in which the interpolation is to be performed, and interpolated values should be determined using the variations between pixels and the correlations of pixels between regions at steps S30 and S40.

The determination of the direction performed by the direction determination unit is described below. First, if both a vertical upper variation Var_mu and a vertical lower variation Var_md obtained by the correlation calculation unit are greater than a predetermined threshold, it is determined that the interpolation direction is a vertical direction. Further, the correlation values between shift regions having a maximum correlation, the value of which is smallest of the left and right direction correlation values Cor_l and Cor_r, are compared with each other. If the difference between the correlation values is lower than a predetermined threshold, it is determined that the interpolation direction is a vertical direction. The determination of the interpolation direction is performed by the following program.

```
if( (var_mu>th and var_md>th) )
    dir =MEAN(Pm);
else if(|cor_l - cor_r|<THreshold1)then
    dir = MEAN;
else
    if(cor_l<cor_r)then
        if(|cor_l - cor_r|>THreshold2)then
            dir=LEFT(P1);
        else
            if(var_lu>th and var_rd>th)then
                if(var_mu<th and var_md<th)then
                    dir = LEFT;
                else
                    dir = MEAN;
                end if;
            else
                dir = MEAN;
            end if;
        end if;
    else
        if(|cor_l - cor_r|>THreshold2)then
            dir=RIGHT(Pr);
```

With the execution of the above program, the direction determination unit determines the interpolation direction, and the interpolation unit determines interpolated values using the correlation values calculated by the inter-region pixel correlation calculation unit. Each of the interpolated values is determined to be a mean value of the middle pixels included in the shift regions that are determined to have the maximum correlation of the left and right direction correlations. That is, as shown in FIG. 6, if it is determined that the shift regions of FIG. 6 have the maximum correlation of the right direction correlations, the value of the pixel to be interpolated is determined to be the value (mean value), obtained by dividing the sum of the middle pixels (pixels indicated by black circles) of the shift regions that are located on the previous and next lines of the pixel to be interpolated by 2.

When the direction determination unit determines the interpolation direction and the interpolation unit determines the interpolated values, the output unit interpolates the pixel to be interpolated on the basis of the determined interpolation direction and interpolated values, and outputs interpolated image data at step S50.

As described above, the present invention provides an apparatus and method for performing intra field interpolation for a de-interlacer, which interpolates pixels in a diagonal direction, not in a simple vertical direction, with respect to even an edge having a large slope, using variations and correlations between pixels, thus further improving an image quality compared to a conventional line repetition method, an inter-field interpolation method without motion compensation and a linear intra-field interpolation method, which were proposed in the prior art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for performing intra-field interpolation for a de-interlacer, comprising:

an intra-region inter-pixel variation calculation unit receiving image data and calculating variations between pixels included in upper, lower, left and right regions on previous and next lines of a pixel to be interpolated;

an inter-region pixel correlation calculation unit receiving the image data and calculating correlations between certain regions around the pixel to be interpolated;

a direction determination unit determining a direction in which interpolation is to be performed using the variations between pixels and the correlations calculated by the intra-region inter-pixel variation calculation unit and inter-region pixel correlation calculation unit, respectively;

an interpolation unit determining values of the pixel to be interpolated using pixel values in regions having a maximum correlation calculated by the inter-region pixel correlation calculation unit; and an output unit receiving interpolated values that are output from the interpolation unit in the direction determined by the direction determination unit, and outputting interpolated image data.

2. The intra-field interpolation apparatus according to claim 1, wherein the inter-region pixel correlation calculation unit calculates a correlation between a left region on the previous line of the pixel to be interpolated and a right region of the next line of the pixel, and a correlation between a right region of the previous line of the pixel and a left region of the next line of the pixel.

3. The intra-field interpolation apparatus according to claim 1, wherein the interpolation unit determines the value of the pixel to be interpolated to be a mean value of middle pixels included in regions having a maximum correlation.

4. A method of performing intra-field interpolation for a de-interlacer, comprising:

calculating variations between pixels included in regions around a pixel to be interpolated and calculating correlations of pixels between the regions using input image data;

determining a direction in which interpolation is to be performed using the variations between pixels and the correlations of pixels between the regions, and determining interpolated values using the correlations; and interpolating the pixel to be interpolated depending on the determined interpolation direction and interpolated values, and then outputting interpolated image data.

5. The intra-field interpolation method according to claim 4, where the calculating of variations between pixels comprises setting regions in which the variations are to be calculated, and calculating the variations for each of the regions.

6. The intra-field interpolation method according to claim 5, wherein the regions in which the variations are to be calculated include left, right and middle regions of a previous line of the pixel to be interpolated, and left, right and middle regions of a next line of the pixel.

7. The intra-field interpolation method according to claim 5, wherein the calculating of the variations for each of the regions comprises determining a mean value of pixels included in each of the regions, and obtaining absolute differences between respective pixel values and the mean value.

8. The intra-field interpolation method according to claim 4, wherein the calculating of the correlations of pixels between regions comprises calculating a correlation (left direction correlation) between a left shift region of the previous line of the pixel to be interpolated and a right shift region of the next line of the pixel, and calculating a correlation (right directional correlation) between a right shift region of the previous line of the pixel and a left shift region of the next line of the pixel.

9. The intra-field interpolation method according to claim 8, wherein the calculating of the correlations between shift regions is performed while shifting both the shift region on the previous line of the pixel to be interpolated and the shift region on the next line of the pixel by one frame in opposite directions.

10. The intra-field interpolation method according to claim 4, wherein the determining of the interpolation direction is performed so that a minimum value of left direction correlation values and a minimum value of right direction correlation values are compared to each other, and the interpolation direction is determined to be a vertical direction when a difference between the minimum values is less than a predetermined threshold.

11. The intra-field interpolation method according to claim 4, wherein the determining of the interpolated values is performed so that each of the interpolated values is determined to be a mean value of middle pixels included in shift regions having a maximum correlation of left and right direction correlations.

* * * * *